(No Model.)  7 Sheets—Sheet 5.

G. R. CLARKE
ENVELOPE OR BAG MACHINE.

No. 430,728. Patented June 24, 1890.

WITNESSES:
E. B. Bolton
J. D. Caplinger

INVENTOR:
George R. Clarke
By Henry Connett
Attorney.

(No Model.) 7 Sheets—Sheet 6.
G. R. CLARKE.
ENVELOPE OR BAG MACHINE.

No. 430,728. Patented June 24, 1890.

WITNESSES:
E. B. Bolton
J. S. Caplinger

INVENTOR:
George R. Clarke,
By Henry Connett
Attorney.

(No Model.) 7 Sheets—Sheet 7.

G. R. CLARKE.
ENVELOPE OR BAG MACHINE.

No. 430,728. Patented June 24, 1890.

WITNESSES:

INVENTOR:
George R. Clarke.
By Henry Connett
Attorney.

UNITED STATES PATENT OFFICE.

GEORGE R. CLARKE, OF MONTELL, TEXAS, ASSIGNOR TO THE AJAX ENVELOPE COMPANY, OF NEW YORK.

ENVELOPE OR BAG MACHINE.

SPECIFICATION forming part of Letters Patent No. 430,728, dated June 24, 1890.

Application filed January 15, 1889. Serial No. 296,412. (No model.) Patented in Canada June 10, 1889, No. 31,552.

*To all whom it may concern:*

Be it known that I, GEORGE R. CLARKE, a citizen of the United States, and a resident of Montell, Uvalde county, Texas, have invented certain Improvements in Envelope or Bag Machines, (for which a patent has been granted in Canada, No. 31,552, dated June 10, 1889,) of which the following is a specification.

My invention relates to that class of machines for making envelopes, paper bags, and the like wherein the blank which is to form the envelope or bag is automatically fed into the machine at its receiving end by a suitable feeder and is folded and gummed on its way through the machine, being finally delivered in a marketable condition at the delivery end of the machine.

My invention will be fully described hereinafter, and its novel features carefully defined in the claims.

In the accompanying drawings, which serve to illustrate my invention, I have shown it embodied in a machine for making an oblong bag or envelope open at one end. The machine is not provided with means for folding the closing-flaps, nor for applying gum to the same.

Fig. 3 is a view of the right side of the machine, showing its upright inclined position, the top leaning toward the back, at which side the attendant usually stands. Fig. 3$^a$ is a detail view illustrating the side-flap gummer. This device will be hereinafter described. Fig. 3$^b$ is a view of the left side of the machine. The driving pulleys seen at the right in Fig. 1 are omitted from this view. Fig. 5 is a view of the air-exhauster in the driving-pulley, the view being substantially a section along line 5 5 in Fig. 1 between the tight and loose pulleys. Fig. 5$^a$ is a section along line 5$^a$ 5$^a$ in Fig. 5.

All of the above figures are drawn to the same scale. The following figures are drawn to double the scale of the principal figures.

Figs. 6 and 7 are sectional detail views. Fig. 7 is a similar elevation of the lower delivery end of the machine, taken in the plane indicated by line 7 7 in Fig. 2. Fig. 7$^a$ is a detail view illustrating the mechanism for effecting the fold of the bottom flap. Fig. 7$^b$ is a sectional view of the gum-roller for applying gum to the bottom flap; and Fig. 7$^c$ is a view illustrating the construction of the pressure-roller N, whereby the gumming-roller is prevented from applying gum thereto when no blank is passing. Fig. 8 is a view of a bag such as this machine is designed to make, the view being on the same scale as the principal figures.

Before proceeding to minutely describe my machine I will say that, as herein represented, it stands erect and inclined. The blanks are fed in at the upper end, carried downward positively by an endless carrier, gummed and folded as they move along, and finally delivered below or at the bottom of the machine.

In the operation of the machine the blank is separated from the pile by a suitable feeder, and its advanced end fed to a mechanical gripper mounted in a moving endless carrier. This latter carries the blank while positively grasped and held over a gum-roller, and then through folders, which fold down the side flaps of the bag. The blank now enters between the main carrier and a supplementary pressure-belt, and these carry it on over the roller that applies gum to seal the bottom flap, and through the bottom-flap folder and sealer. The bag is now delivered in a merchantable condition.

All the movements of the machine are automatic, and the blank is positively gripped and held by the carrier, which is also positively driven, so that the parts cannot get out of "time."

The rollers for applying the gum are so arranged that they will not apply gum to any part of the machine when no blank is passing.

Having thus indicated, briefly, the general character of the machine, I will now describe its construction more minutely with reference to the accompanying drawings.

In general the machine comprises a stout frame A, usually of metal and secured firmly at its base to any suitable bed-plate.

A' is a brace or support for the frame A, which latter is inclined a little (see Fig. 3) toward the rear. At the upper end of frame A is mounted the main driving-shaft B, bearing a tight pulley C and a loose pulley C'. A pinion $a$ on shaft B gears with a spur-wheel $b$ on the upper sprocket-wheel shaft D, thereby driving the latter. This shaft D drives the lower sprocket-wheel shaft D', through the medium of an upright shaft E and miter-gears $c\ c$. Shaft E is mounted in bearings on frame A.

Figure 2:
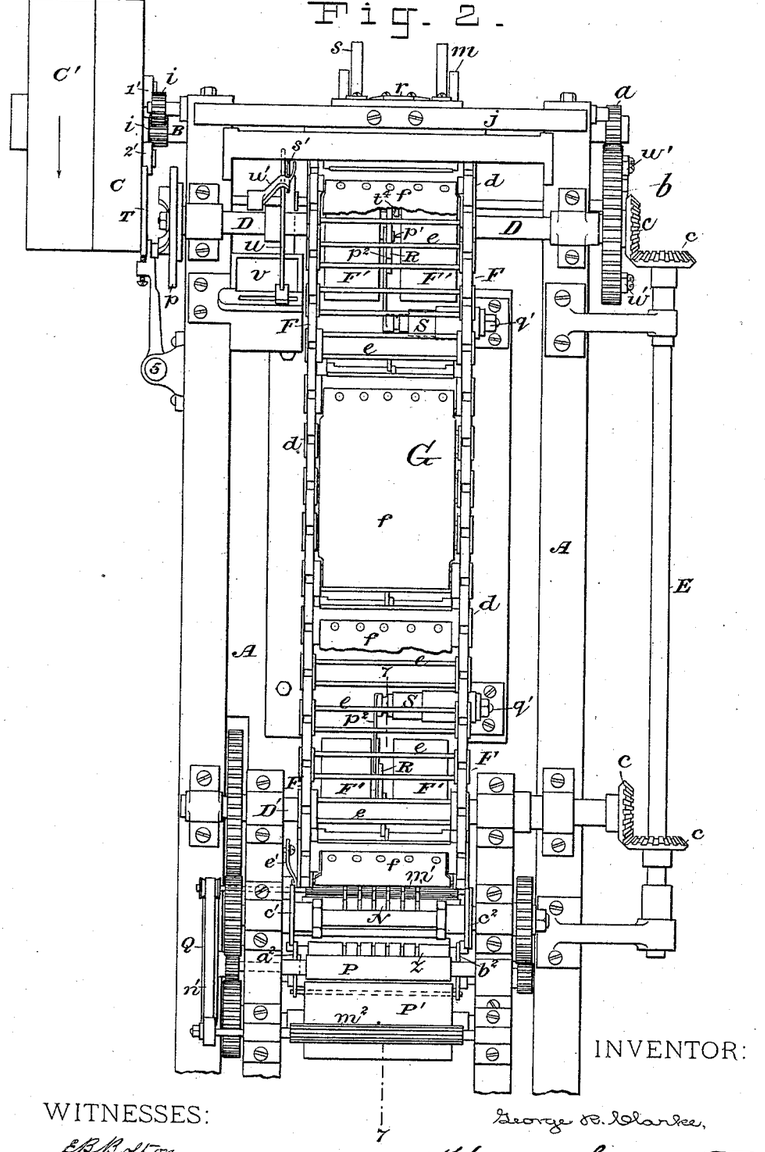
Fig. 2 is a similar view of the opposite or front face, as seen from the direction indicated by arrow 2 in Fig. 3.

F F are ordinary sprocket-wheels arranged in pairs and fixed on the respective shafts D D', and F' F' are sprocket-drums also arranged in pairs and fixed on the respective shafts D D' inside of or between the sprocket-wheels. These sprocket wheels and drums support and drive an endless carrier G, which is made up of the following parts: Two endless Vaucauson chains $d\ d$ are mounted on the wheels F F and connected by the extension of their hinging-pins $e\ e$ across from one chain to the other. The chains $d$ and pins $e$ are provided with an apron $f$, of leather or other like material, to form a smooth surface to receive the blank. This apron is made up of short sections secured at their advancing ends to transverse ties extending across from chain to chain at suitable intervals. The object in making the apron sectional is to allow it to pass freely over the drums without having to stretch. In Fig. 2 two of the sections of the apron $f$ are broken away to expose the parts behind.

Figure 4:
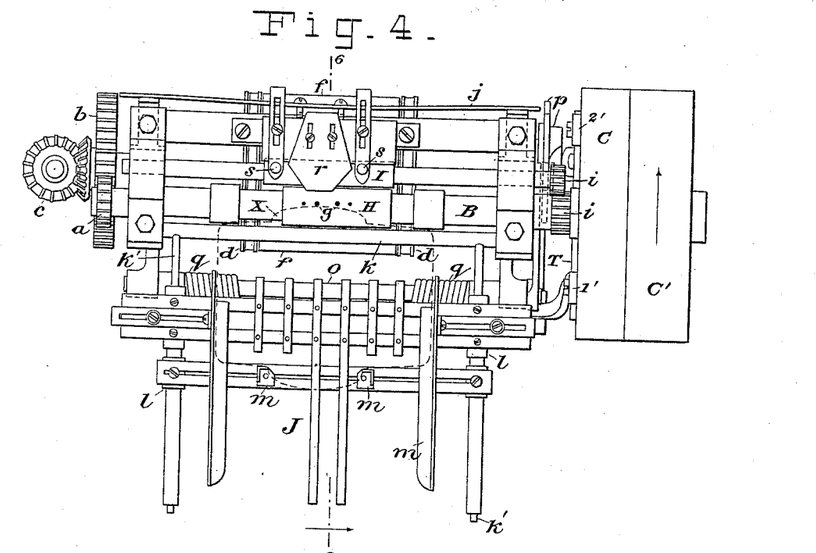
Fig. 4 is a plan of the machine, as seen from the direction indicated by arrow 4 in Fig. 3.
Figures 5, 5A, 8:
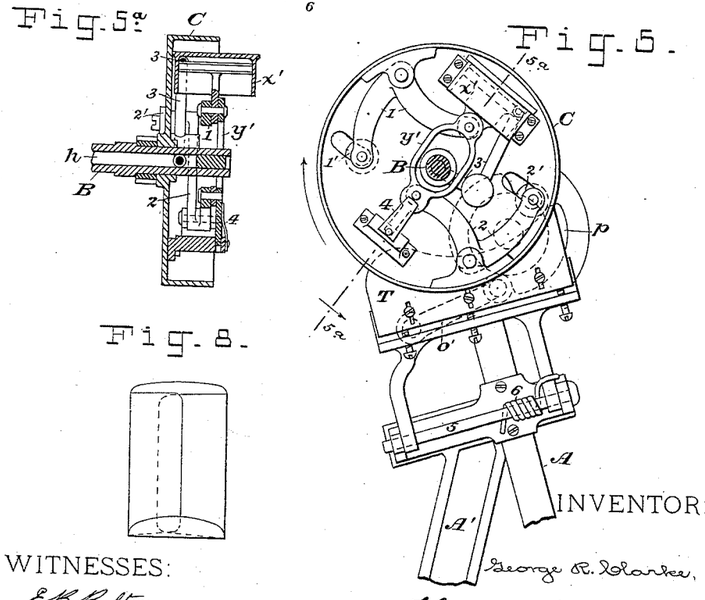

I will now describe the pneumatic mechanical feeder with special reference to Figs. 4, 5, 5ª, and 6. I will say here, however, that while this feeder is especially well adapted to the machine it is also adapted for general use, and I do not specifically claim it in this application, having embodied it as a special feeding device in another application, Serial No. 319,981.

Figure 6:
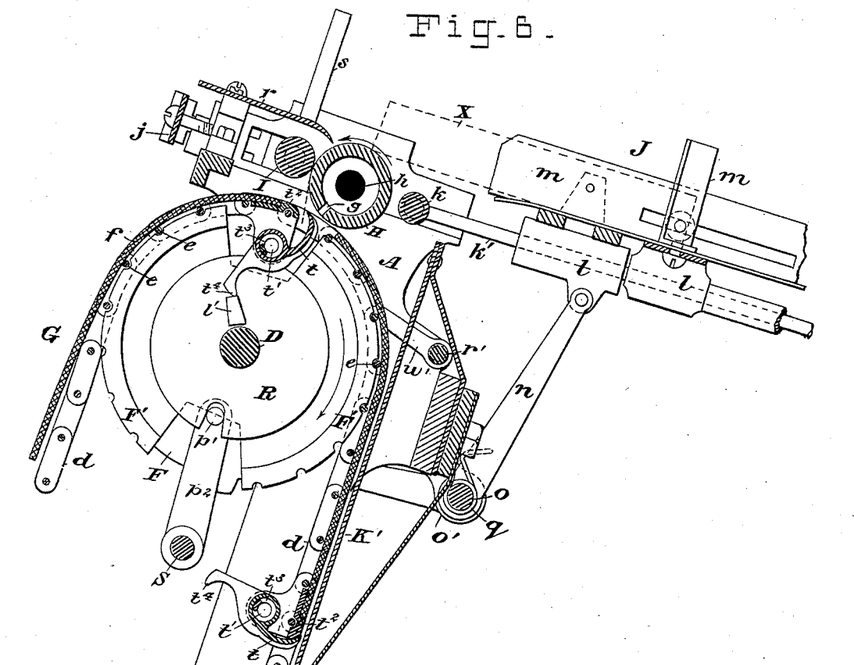
Fig. 6 is a sectional elevation of the upper receiving end of the machine, taken substantially in the plane indicated by line 6 6 in Fig. 4.

Forming a part of the main driving-shaft B is a hollow roller H, which I will call the "suction-roller." This roller will be, by preference, a little larger than the shaft, and will be situated at about the middle of the width of the carrier G, where the latter breaks over the upper drum, as seen in Fig. 6, with its periphery in contact with or close to the apron $f$ on the carrier. In the roller H are one or more holes or perforations $g$, as shown. The hollow in roller H communicates with a bore $h$ in shaft B, (see Fig. 5ª,) which communicates in turn with the air-exhauster, (illustrated in Figs. 5 and 5ª,) and which will be hereinafter described.

I is a pressure-roller arranged back of the suction-roller H and in peripheral contact therewith. This roller I is driven positively in unison with the roller H through the medium of gears $i$, (seen in Fig. 4,) and it is held up against the roller H by a suitable spring $j$, which may be arranged in any convenient manner adapted to accomplish the result.

J is the reciprocating blank-platform as a whole. The precise construction herein shown need not be adhered to in constructing, mounting, and operating this platform; but I will describe that herein illustrated, which is the one preferred.

On a rock-shaft $k$, just in front of the suction-roller H, are fixed two parallel guide-arms $k'\ k'$, on which slide the carriage $l$ of the blank-platform. On this carriage are mounted in slotted bars the adjustable side and back stops $m\ m$, which embrace the pile of blanks at the sides and rear. It will be understood that the rear of the blank-platform is presented toward the rear face of the machine, where the attendant stands.

The reciprocatory motion is imparted to the blank-platform by means of two arms $n$, coupled at their upper ends to the carriage $l$, said arms being attached at their lower ends to a rock-shaft $o$, as seen in Fig. 6. The shaft $o$ is rocked in such a manner as to move the blank-platform forward (toward the left in Fig. 6) by means of a cam $p$ on the upper sprocket-wheel shaft D, which acts on a roller in the end of an arm $o'$, fixed to the rock-shaft $o$. A spring or springs $q$ on the shaft $o$ serves to retract the blank-platform when the cam has passed. As herein shown, the parts are so proportioned that the peripheral speeds of the endless carrier G, the suction-roller H, and the pressure-roller I are alike, and the cam $p$ moves the blank-platform J forward toward the rollers H and I with substantially the same speed as that imparted to the periphery of roller H. The arrows on or adjacent to the several parts show the direction of motion. Of course the parts will be properly "timed," as in all automatic machines of this general character.

The operation of feeding the blanks into the machine is as follows: Any suitable number of blanks are placed in a pile on the blank-platform and evened by pressing them up snugly against the stops $m\ m$. The end of the pile of blanks will now project out over the suction-roller H and the bottom blank of the pile will rest on or stand very close to said roller, as indicated by the dotted lines in Fig. 6, where X represents the pile of blanks. The machine is set in motion, and when the holes $g$ in the revolving suction-roller H are at the top or upper side and directly under the blank the air is exhausted from said roller. This causes the bottom blank to adhere thereto. At this instant the cam $p$ advances the blank-platform, and thus the latter yields to the movement of the roller H, and the said roller in its rotation carries the attached end of the blank down between said roller and the pressure-roller I until it is nipped between them. The cam $p$ holds the blank-platform in its advanced position until the rollers have drawn the bottom blank nearly out, when it passes, and the spring $q$ instantly retracts the blank-platform to its first position. (Seen in Fig. 6.) The plate or finger $r$ is a precautionary device, designed to prevent more than one blank from being carried into the machine by the blanks adhering together, and the adjustable uprights $s$ are designed to keep the pile of blanks back against the stops $m\,m$. When the platform J is moved forward quickly, the momentum tends to throw the pile of blanks forward; but these uprights serve as stops to check such a movement and to even up the front edge of the pile of blanks at each forward movement of the platform. The rollers H and I carry the blank directly downward toward the carrier G, and at this moment one of a number of grippers $t$, mounted in the carrier, seizes it and clamps it fast to the latter. These grippers are placed at the proper distances apart and so timed as to seize each blank in succession as its advancing end is fed to the carrier by rollers H and I. The means employed for actuating the grippers will be hereinafter described. The blank as it is drawn through rollers H and I receives gum on one of its lateral flaps from a gum-roller $u$, fixed on shaft D, the lower part of said roller turning in a gum-fountain V. After it has received the gum the blank is drawn through stationary folders K K of a well-known kind, which fold down the lateral flaps over a stationary folding-blade K'. After the blank passes through these folders it is next carried under a pressure-belt L, arranged centrally over carrier G and serving to seal the lateral flaps and then under two other pressure-belts L' L'. These belts L' L' are mounted on a middle roller $L^2$ and outer rollers $L^3$, the roller $L^2$ being driven from shaft D' through the medium of gear-wheels $w$. (Seen in Fig. 1.) Belts L' are arranged (see Fig. 7) at the point where carrier G begins to break over the lower drum, and when the advancing end of the blank or partly-finished bag emerges from under the belts L' the gripper $t$ is made to release it. The blank now leaves carrier G and passes (obliquely downward) between two grid-like guides $x$ and $y$ until its advancing end is nipped between a gumming-roller M and a pressure-roller N. These rollers are circumferentially grooved to receive the bars of the guides, the bars of guide $x$ engaging the grooves in roller M and the bars of guide $y$ engaging the grooves in roller N. These guides serve as strippers to prevent the blank from adhering to the rollers. The gumming-roller M applies gum to the body of the bag or envelope for the purpose of sealing down the bottom flap. It receives its gum from a gum-reservoir O and a gum-supply roller O' therein. This gum-roller M is positively driven from shaft D', and it has certain peculiarities of construction that will be hereinafter described. As the advancing end of the partly-finished bag emerges from between guides $x$ and $y$, the portion of the blank which forms the bottom flap and which is on the advancing end of the blank or bag passes down behind or back of two rollers $z\,z'$, also by preference circumferentially grooved, which I will call "folding-rollers." The flap passes down back of a vibrating comb-like guard $a'$, which keeps it clear of the folding-roller and in front of a vibrating folder or striker $b'$. When the partly-formed bag has advanced far enough, a cam $c'$ on a shaft $d'$ (see Fig. 7) draws back the guard $a'$, and a cam $c^2$ (see Fig. 7$^a$) on shaft $d'$ passes and allows a spring $e'$ to drive the striker $b'$ forward, when it creases the blank along the line where the bottom flap is to be folded and drives the fold between the folding-rollers $z\,z'$. These folding-rollers are positively driven and they carry the bag forward, seal down the bottom flap, and pass the advancing end of the bag between two delivery-rollers P P', from which it falls completed. These rollers P P' are plain rollers adapted and designed to smooth, flatten, and straighten the bag or envelope.

Figures 7, 7A:
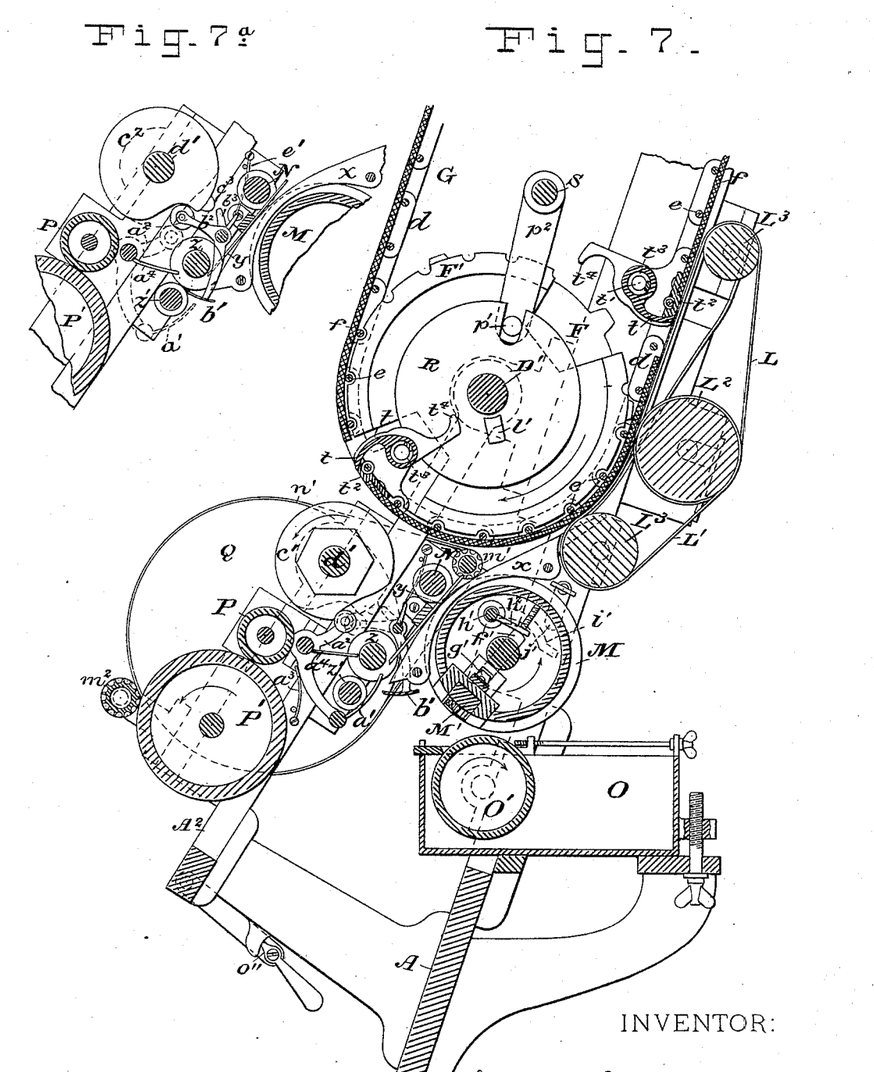

I will now revert to the bottom-flap-folding devices, in order to describe them more minutely. The comb-like guard $a'$ has an arm $a^2$, provided with a roller rolling on cam $c'$, and this roller is elastically held up to cam $c'$ by a suitable spring $a^3$. The shaft carrying the guard $a'$ may have guard-fingers $a^4$, projecting toward the folding-rollers $z\,z'$, to prevent the advancing end of the bag from being deflected upward, as it is apt to be. The striker $b'$ has an arm $b^2$, carrying a roller, (see Fig. 7$^a$,) which bears on cam $c^2$. This cam holds the striker normally back, and any suitable spring, as $e'$, serves to drive the striker forward when the cam passes. Fig. 7$^a$ shows the striker driven forward by the spring $e'$, the roller on arm $b^2$ having moved into a deep recess in the cam.

In order to overcome any hesitation in the action of spring $e'$ when the machine is running rapidly, I prefer to provide the cam $c^2$ (see Fig. 7$^a$) with a projection or lug $c^3$, adapted to take under an arm or lug $b^3$ on arm $b^2$ at the proper moment, and thus start the striker forward the instant the cam passes. This is a precautionary device only.

Figures 3, 3A:
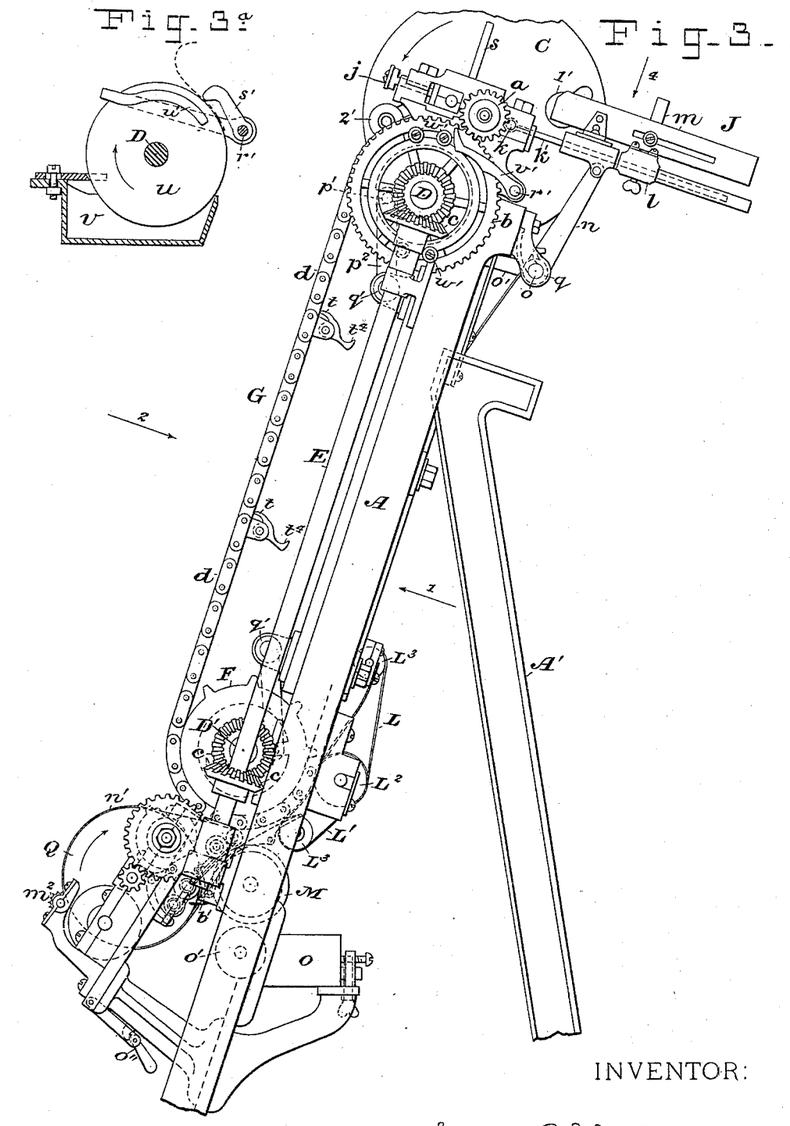
Figure 3B:
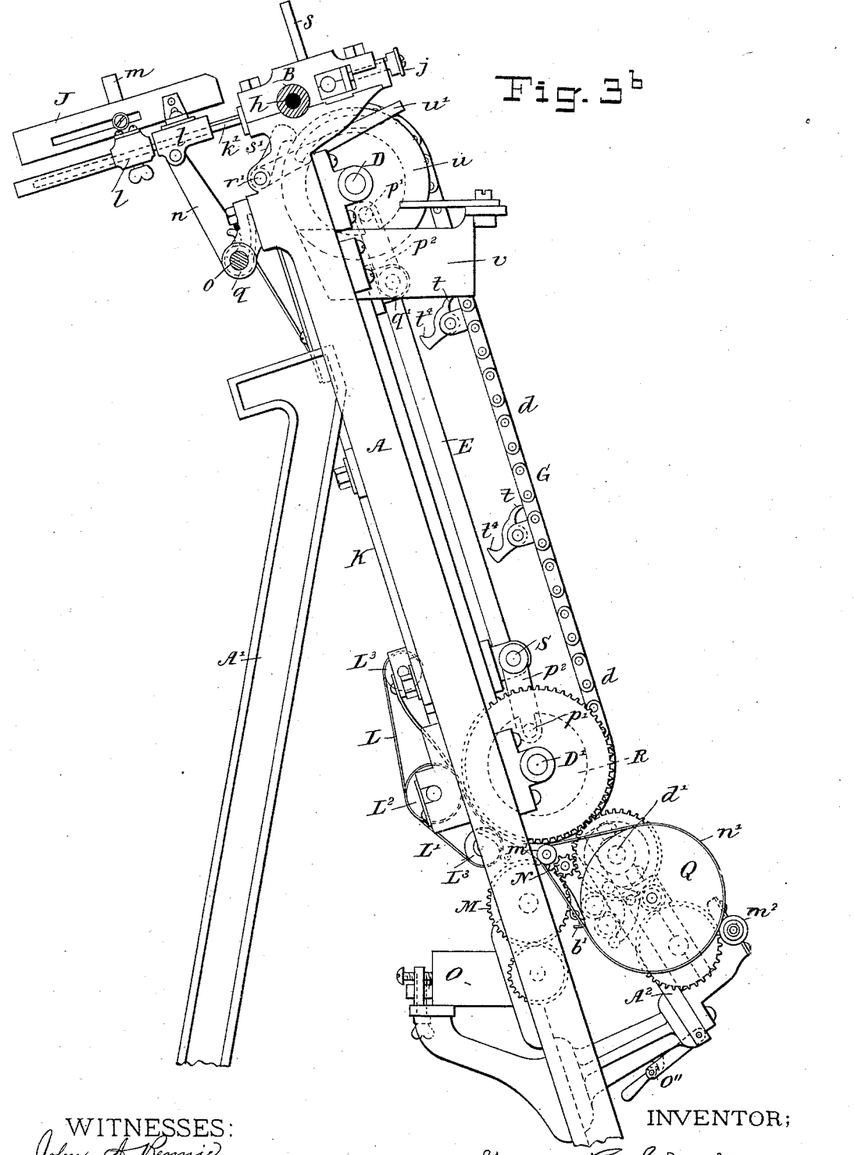

In order to avoid confusion, I have not shown the gear-wheels in Fig. 7; but they may be seen on a smaller scale in Fig. 3$^b$. In order to enable any one skilled in the art of constructing mechanism to provide the necessary gearing, I will say that the gumming-roller M, the pressure-roller N, the gum-supply roller O', the folding-rollers $z$ and $z'$, and the delivery-rollers P P' all have the same peripheral speed as carrier G; and cam-shaft $d'$ and gumming-roller M each makes two revolutions to one of the lower sprocket-wheel shaft D'.

A gear-wheel on shaft D' drives the cam-shaft d' directly, and the gear-wheel on shaft d' drives directly the pressure-roller N, the folding-roller z, and delivery-roller P. Roller N drives gumming-roller M directly, and this latter drives the gum-supply roller directly. The folding-roller z drives its companion-roller z' directly, and delivery-roller P drives its companion roller directly. All of this is effected positively by means of toothed gears, as shown.

In order to keep the blank from adhering to carrier G after the gripper has released it and to direct its advancing end properly between the guides $x$ $y$, I employ a fluted roller $m'$, which I call a "flier," arranged just above the entrance to said guides, and to prevent the bag, when delivered, from adhering to the lower delivery-roller P', I provide a similar flier $m^2$. These fliers should rotate rapidly, and may be driven from any desired source. I drive the former by a belt $n'$ from a large sheave Q on the shaft of the upper delivery-roller P, and the latter also from said sheave by means of a friction-roller.

For convenience in getting at the gumming-roller M from the rear of the machine, I prefer to mount all the flap folding and delivering mechanism seen in Figs. 7 and 7ª, including the pressure-roller N and guide $y$, on a supplementary frame $A^2$, which is hinged on shaft D', and when in place is secured by a button $o''$ or other like fastening device. This construction enables all the mechanism mounted on the frame $A^2$ to be turned back and up out of the way.

Figure 7B:
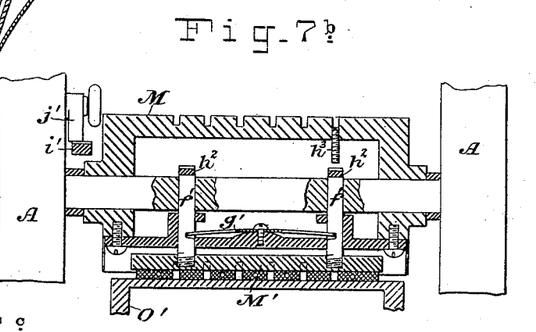

I will now revert to the construction of the gumming-roller M, (illustrated in Figs. 7 and 7ᵇ,) premising that the main object of this special construction is to prevent the application of gum to the feeding-face of the roller, and to limit its application to the "printing-face," so-called, only. This roller M is hollow, and is circumferentially grooved, as stated. In a recess in the shell of the roller is mounted the printing-face M', which has two stems $f'$ $f''$, that play through the shaft of the roller. A spring $g'$, the ends of which engage notches in said stems, serves to hold the printing-face M' drawn up into its recess with its face flush with that of the roller. In the hollow of the roller is mounted a rock-shaft $h'$, which has two arms $h^2$ $h^2$, that bear on the ends of stems $f'$. Shaft $h'$ projects out through the end of the roller M, and on its projecting end is fixed an arm $i'$. (Seen in dotted lines in Fig. 7.) As the roller revolves, this outer arm $i'$ is brought into contact with an adjustable cam-piece $j'$, secured to the machine-frame, and this cam-piece acts on arm $i'$ in such a manner as to partially rotate shaft $h'$ and cause the arms $h^2$ thereon to push out the printing-face M' to a sufficient extent to cause the latter to touch the gum-supplying roller O' and take gum therefrom. It will be seen by inspection of Fig. 7 that the peripheries of rollers M and O' are not in contact, and consequently gum will only be supplied to the printing-face. This printing-face will preferably have a rubber surface or the like, and it will have the proper form to apply a stripe of gum for sealing the bottom flap of the bag. In the present case this will be a narrow stripe slightly curved or arched. By turning the cam-piece $j'$ out of the path of arm $i'$ the printing-face of roller M will receive no gum and be rendered inoperative for the time.

Figure 7C:
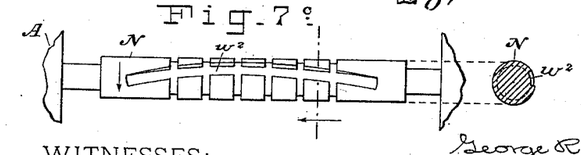

As there may be times when the machine is running that a blank will be missed, I provide against the application of gum to the pressure-roller N by the means fully illustrated in Fig. 7ᶜ, which shows roller N in elevation and cross-section on the same scale as Fig. 7. A shallow recess $w^2$ is formed on the face of roller N, corresponding in shape and size to the printing-face M' of the gumming-roller M, and so arranged with respect to said printing-face that the recess $w^2$ will always register with said face when the latter is in position to apply gum to the blank. Consequently if no blank is passing the printing-face will not come in contact with any part of the surface of roller N, and if a blank is passing it will receive gum. The grid-like guide $y$ will always be over or behind the blank when the latter is receiving gum, and this guide will be a sufficient backing for the blank. The recess $w^2$ in roller N will not interfere with its functions as a feed-roller for the blank, as some part of said roller is constantly bearing on the blank. In the present construction the diameter of roller N is exactly one-fourth that of the roller M, and consequently makes four revolutions to one of said roller M, and in order to insure the registry of recess $w^2$ with the printing-face M' this or some other exact proportion should be maintained between the diameters of said rollers. The recess $w^2$ is not visible in Fig. 7, being hidden behind the guide $y$.

I will now revert to the grippers $t$ and describe them, together with the devices for releasing them. The drums F', as before stated, are arranged between the sprocket-wheels on the respective shafts D and D', and between the two drums on the shaft is left a narrow space. There is a recess or aperture in the opposite faces of each drum to allow room for the gripper $t$. The gripper oscillates or rocks on journals $t'$, carried by suitable lugs on the chains $d$, and it is held up elastically against the gripper-plate $t^2$ by a suitable coil-spring $t^3$. The gripper is opened by means of a stud $l'$, which is arranged in the path of an arm or tail $t^4$ on the gripper. In order that this stud $l'$ may be set or adjusted so as to open the gripper at the proper time and allow its spring to close it at the proper time, I mount loosely on shaft D a disk or plate R and fix the stud $l'$ to this disk. In the edge of this is a notch which is engaged by a pin $p'$ on an arm $p^2$, fixed on a shaft S in the machine-frame. By turning shaft S the disk R and the lug $l'$ thereon may be shifted. The shaft S may be fixed by a nut $q'$ (see Fig. 2) or other fastening device. The purpose of this device is to make the gripper open and close a little earlier or a little later, as may be necessary. There are two of these devices for opening the grippers, one arranged above and one below; but as they are herein represented as constructed exactly alike I have used the same letters of reference for both.

I will now revert to the device for applying gum to the lateral flap of the envelope, in order to describe the means employed for preventing the application of gum to the entire length of the flap. The gumming roller or disk $u$ for this purpose is fixed on shaft D and rotates therewith, and its periphery is about flush with the surface of the carrier G, whereby the margin of one of the lateral flaps of the blank projects out over said disk $u$ and receives gum therefrom. But it is desirable that the stripe of gum shall not extend quite to the ends of the flap, and to prevent this I provide the device I will now describe with special reference to Figs. 3 and $3^a$. On a shaft $r'$, mounted to oscillate in the main frame, are secured a presser-arm $s'$ and a lifter-arm $u'$, arranged to stand near to disk $u$. The margin of the blank passes between these arms and over the periphery of the disk $u$, as the blank is carried down from the rollers H I, as indicated by the dotted line in Fig. $3^a$. The weight of the arms $s'$ and $u'$ will usually suffice to keep the former pressed down upon the passing blank so as to hold it against the gumming roller or disk $u$, and to insure its receiving gum, although a spring may be used for this purpose, if deemed necessary; but in order to slightly lift the blank clear of the gumming-disk $u$ at the proper time, whereby a little space at both ends of the blank shall be left ungummed, the shaft $r'$ has at one end an arm $v'$, which stands in the path of certain adjustable studs $w'$, (see Fig. 3,) mounted in a slot in the gear-wheel $b$ on shaft D, which studs take under said arm $v'$ and raise it, thus causing the lifter $u'$ to take under and raise the blank. As the blanks follow each other quite closely through the machine, two studs $w'$ are set more or less closely together, and adapted to raise the tail of the forward blank and to keep the lifter elevated until the advancing end of the next succeeding blank has passed over it. Thus both ends of the blanks are kept out of contact with the gumming-disk $u$. The lifter-arm $u'$ is bent in the manner shown, in order that its free end may be directed toward the back of the machine.

I will now revert to the air-exhauster that I prefer to employ, and which is illustrated in Figs. 5 and $5^a$, premising, however, that other kinds of air-exhausters may be employed in place of this. As I have before stated, the air is exhausted from the suction-roller H at proper intervals, in order to cause the forward end of the bottom blank to adhere thereto. I will add that as here constructed and proportioned the suction-roller H makes two revolutions for each blank that is fed, and consequently provision is made for exhausting the air at alternate revolutions only. I may also state that as here constructed two blanks are fed at each revolution of shaft D.

In the fixed pulley C is secured an air-pump cylinder $x'$, the piston of which is coupled by a yoke $y'$ to two bell-cranks 1 and 2, also mounted in the pulley. On studs in the arms of these bell-cranks are rotatively mounted rollers $1'$ and $2'$. The studs play in slots in the inner face of pulley C and the rollers stand outside of the pulley. The cylinder $x'$ communicates through a bore in a suitable tube 3 with the bore $h$ in shaft B. This communication of the air-pump cylinder with the suction-roller H may be effected through any form of closed channel or passage. When the pulley rotates, a cam T pushes rollers $1'$ and $2'$ alternately inward toward shaft B. When roller $1'$ is pushed in, the piston is driven into the cylinder $x'$, as seen in Fig. 5, and when roller $2'$ is pushed in said piston is drawn back. Thus inward pressure on either of said rollers operates the piston; but they move it in opposite directions. A spring 4 presses on the guided extremity of the yoke $y'$ and serves to overcome the effect of centrifugal force on the arms and rollers of the bell-cranks.

The cam T, which acts on rollers $1'$ and $2'$ and pushes them inward toward shaft B, is pivotally mounted on a rod 5 on the machine-frame, and a spring 6, coiled about said rod, serves to throw said cam out of the plane of said rollers normally.

Figure 1:
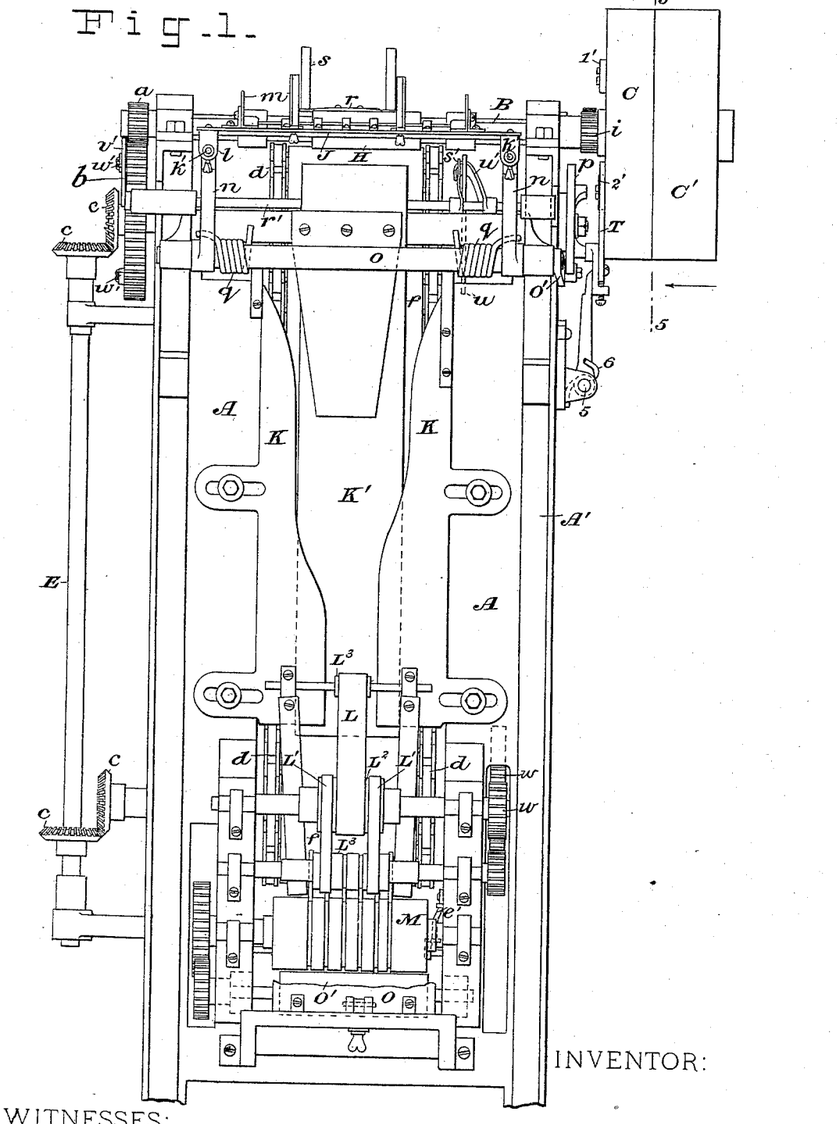
Figure 1 is a view of that face of the machine which I will call, for convenience, the "back," as seen from the direction indicated by the arrow 1 in Fig. 3.

The cam $p$, Figs. 1 and 2, which actuates the blank-platform, is a double cam—that is, the edge of it serves to actuate the blank-platform, while on its face is a cam which acts on a projection on the pivoted cam T to push the latter up into the plane of rollers $1'$ and $2'$. In Figs. 1 and 2 the cam T is shown pushed up to the pulley C in position to act on the air-exhauster. The operation is as follows: The pulley C and shaft B make one revolution when the pivoted cam T is back or out of the plane of rollers $1'$ and $2'$, and the air-exhauster is therefore not actuated. The next revolution, however, causes cam $p$ to set cam T in operative position when roller $2'$ will strike it, thus drawing back the piston and exhausting the air from the suction-roller. When pulley C shall have made half a revolution, roller $1'$ will strike cam T and push the piston back into cylinder $x'$, thus "breaking the vacuum." During the next revolution of the pulley the air-exhauster will again remain inoperative.

I have not shown the blank passing through the machine in any of the figures of the drawings.

As I have before stated, the feeding mechanism herein described forms the subject-matter of another application, and I do not herein limit myself to any special device for feeding the blanks to the grippers of the machine.

The machine is adapted to be adjusted for making several sizes of bags or envelopes within limits.

Having thus described my invention, I claim—

1. The combination, with a feeder that feeds the blanks to the endless carrier, of the said carrier provided with grippers for holding the advancing ends of the blanks, the adjustable gripper-openers, the folders for folding the lateral flaps of the blank, and the folding-blade, substantially as set forth.

2. The combination, with the gumming roller or disk $u$ for applying a stripe of gum to the lateral flap of the blank, and the gum-reservoir in which said disk rotates, of the rock-shaft $r'$, the arm $s'$ on said shaft for pressing the blank down upon said disk, the arm, as $u'$, on said shaft for lifting the blank free from said disk, the operating-arm, as $v'$, on said shaft, and the wheel provided with lifting-studs $w'$, arranged to take under and lift said arm $v'$, substantially as set forth.

3. The combination, with the carrier G and the shafts and sprocket-wheels on which it is mounted, of the self-closing grippers mounted in said carrier, the disks R, bearing lugs $l'$, arranged in the path of the tails on the grippers, and the device for shifting the position of the disk and lug, comprising a shaft, as S, bearing an arm $p^2$, on which is a stud $p'$, which engages a notch in the disk, substantially as set forth.

4. The combination, with the shafts D D' and the sprocket-wheels and drums mounted thereon, of the endless carrier G, consisting of two chains $d\ d$, connected at short intervals by rods $e\ e$, and an apron $f$, made up of sections secured at their advancing ends only to the carrier, substantially as set forth.

5. The combination, with a gum-reservoir O and a gum-supply roller O' therein, of a hollow gumming-roller M, having a recessed face, a printing-face M', mounted in said recess and provided with a retracting-spring and a stem $f'$, and a device for throwing out said printing-face in order that it may receive gum from roller O', said device consisting of a rock-shaft $h'$ on said roller, provided with an arm $h^2$, which bears on the end of stem $f'$, and an exterior arm $i'$, and a cam-piece $j'$, secured to the machine-frame exterior to roller M and arranged in the path of the arm $i'$, substantially as set forth.

In witness whereof I have hereunto signed my name in the presence of two subscribing witnesses.

GEORGE R. CLARKE.

Witnesses:
    HENRY CONNETT,
    JOHN D. CAPLINGER.